United States Patent Office 3,506,527
Patented Apr. 14, 1970

3,506,527
LAMINATES CONTAINING TRANS-POLYBUTADIENE
Charles R. Wilder and Henry E. Railsback, Bartlesville, Okla., assignors to Phillips Petroleum Company, a corporation of Delaware
No Drawing. Continuation of abandoned application Ser. No. 49,438, Aug. 15, 1960. This application Apr. 30, 1965, Ser. No. 452,395
Int. Cl. B32b 3/16; C08f 1/28
U.S. Cl. 161—38                              7 Claims

ABSTRACT OF THE DISCLOSURE

A laminated structure comprises a lamina of a normally solid polymer of at least one aliphatic mono-1-olefin in contact with and bonded to a lamina of a cured polybutadiene, said polybutadiene being characterized by having from 70 to 100 percent of the $C_4$ units in the 1,4-trans-configuration, and by having been produced by contacting 1,3-butadiene under polymerization conditions in a hydrocarbon solvent with a catalyst comprising (a) a complex aluminum hydride corresponding to the formula $MAlH_4$, wherein M is selected from the group consisting of lithium, sodium, potassium, rubidium, and cesium and (b) titanium tetraiodide. The polybutadiene is cured with either surfur or a peroxide of the formula

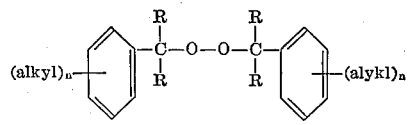

wherein each R is individually selected from the group consisting of alkyl groups containing 1 to 4 carbon atoms and wherein the total number of carbon atoms in said R groups does not exceed 10, where n is 0 to 4 and alkyl is an alkyl group containing 1 to 4 carbon atoms, the total number of carbon atoms in said alkyl groups on each phenyl group not exceeding 4, by heating the polybutadiene lamina containing the curing agent while in contact with the olefin polymer at a temperature within the range of 275° to 500° F. for from 3 minutes to 2 hours.

———

This is a continuation of application, Ser. No. 49,438, filed Aug. 15, 1960, now abandoned.

This invention relates to laminates containing trans-polybutadiene.

Methods for binding polyolefins such as polyethylene to rubber have long been sought and numerous proposals have been made for effecting such bonds. However, in many instances, the bonds obtained by such procedures are weak and tend to separate, thus rendering the laminates unsuitable.

The following are objects of this invention.

An object of our invention is to provide laminates of trans-polybutadiene and solid polymers of 1-monoolefins. A further object of our invention is to prepare laminates of trans-polybutadiene and polyethylene. A further object of our invention is to provide sheets of polyethylene bonded edge to edge by an intervening strip of trans-polybutadiene.

Other objects and advantages of our invention will be apparent to one skilled in the art from the accompanying disclosure.

Broadly, the present invention provides a laminated structure comprising a lamina of trans-polybutadiene and a second lamina of a solid polymer of a 1-monoolefin. The trans-polybutadiene should, preferably, contain 70 to 100 percent of the $C_4$ units in the polymer in 1,4-trans-configuration. To cure the trans-polybutadiene we use a curing agent selected from the group consisting of (1) sulfur and compounds of the formula

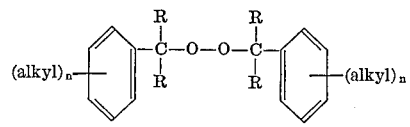

where each R is lower alkyl, where n is 0 to 4 and alkyl is an alkyl group containing 1 to 4 carbon atoms, the total number of carbon atoms in said alkyl groups on each aryl group not exceeding 4.

We have found that strong and permanent bonds can be effected between trans-polybutadiene and polyolefins such as polyethylene by compounding the trans-polybutadiene and curing it in contact with a polyethylene lamina by heat and pressure. Since trans-polybutadiene, when compounded and cured, has elastemeric properties, laminates prepared in this manner have numerous uses in the arts. For example, polyethylene vessels lined with trans-polybutadiene firmly bonded thereto are made available by this process.

Another and very significant aspect of the present invention lies in the extremely strong butt splices or edge to edge laminates that can be made between polyolefin materials and trans-polybutadiene. According to this embodiment of the invention, polyethylene sheets can be bonded edge to edge by an intervening strip of trans-polybutadiene, cured in place.

The trans-polybutadiene used in the fabrication of the laminates of the invention is a product from the polymerization of 1,3-butadiene by 1,4-addition, the process being carried out in a manner such that the polymer molecules have a trans-configuration. This trans-polybutadiene can be manufactured by any suitable procedure. Mixtures of trans-polybutadiene with other polybutadienes having either cis-, vinyl, or random configuration can be used providing at least 70 percent of the total polymer shall be in the trans form.

One method for making the trans-polybutadiene is to polymerize 1,3-butadiene in the presence of a catalyst composition comprising (a) a complex aluminum hydride of an alkali metal, and (b) titanium tetraiodide. The polybutadiene produced by the process of this invention is a rubbery polymer with from about 70 to 100 percent trans-1,4-addition and up to and including 10 percent 1,2-addition, the remainder being cis-1,4-addition.

The complex aluminum hydride employed in the catalyst system with titanium tetraiodide can be represented by the formula $MAlH_4$, wherein M is a metal selected from the group consisting of lithium, sodium, potassium, rubidium, and cesium. The catalyst system which is preferred consists essentially of lithium aluminum hydride and titanium tetraiodide. It is, of course, to be understood that minor amounts of other materials which have no catalytic effect may be included in the system.

The amount of complex aluminum hydride used is usually in the range of 0.5 to 6 mols per mol of titanium tetraiodide. However, a preferred ratio is from 1.3 to 3.0 mols of complex aluminum hydride per mol of titanium tetraiodide.

The polybutadiene produced in accordance with this process is an elastomeric, vulcanizable polymeric material. They are essentially linear, soluble polymers which contain substantially no gel.

The trans-polybutadiene is substantially completely soluble in benzene at room temperature. The transition point, sometimes referred to as melting point, of the polymers can range from below 170° F. to more than 250° F. The term "transition point," as used herein, can be defined as that temperature at which the polymer changes in appearance from an opaque or translucent polymer to a translucent or transparent polymer. The raw polybutadiene is a tough rubber at room temperature and on heating to above the transition point becomes more plastic and pliable in nature. The polymers are believed to be of a low order of crystallinity when recovered initially from the polymerization reactor. When the polymers are heated to temperatures above their transition points, they apparently become amorphous.

The polymerization method is carried out at any temperature within the range of 32 to 300° F., but it is preferred to operate in the range of 50 to 175° F. It is preferred to carry out the polymerization in the presence of an inert hydrocarbon solvent or diluent, although the polymerization can be carried out without the use of such diluent. The polymerization reaction can be carried out under autogenous pressure or any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction.

The amount of the catalyst which is used can vary over a relatively wide range. However, the concentration of the total catalyst composition is usually in the range of about 0.1 weight percent to 10 weight percent, or higher, preferably in the range of 0.25 weight percent to 7 weight percent, based on the total amount of polymerizable monomer charged to the polymerization reactor. When operating at high catalyst levels and with high mol ratios of complex aluminum hydride to titanium tetraiodide, there is sometimes a tendency to form a polymer which contains some gel. When employing high catalyst levels, it is, therefore, frequently desirable to operate with lower mol ratios so as to provide polymers which are substantially gel-free.

Diluents or solvents suitable for use in the polymerization process are hydrocarbons which are not detrimental to the polymerization reaction and which are liquid under reaction conditions of the process. Suitable diluents include aromatics, such as benzene, toluene, xylene, ethylbenzene and mixtures thereof. It is also possible to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentane(isooctane), normal decane, and the like. Mixtures of these paraffinic hydrocarbons can also be employed as diluents in the practice of the process of this invention. Cycloparaffins, such as cyclohexane and methylcyclohexane, can also be used although they are less desirable than the other diluents. Furthermore, mixtures of any of the aforementioned hydrocarbons can be used as diluents.

When preparing the trans-polybutadiene it is frequently preferred to charge the complex aluminum hydride to the reactor as a solution. Suitable solvents for the complex aluminum hydride include ethers, e.g., dialkyl ethers, such as diethyl ether, and cyclic ethers, such as dioxane and tetrahydrofuran. In some cases at least, it seems that a complex of the complex aluminum hydride is formed when it is added to the solvent. For example, when diethyl ether is utilized as a solvent, it appears that an etherate of lithium aluminum hydride is formed. However, it is to be understood that the complex aluminum hydride and the titanium tetraiodide, either individually or as a mixture, can be charged to the reactor in solid form. When added as solids, it is preferred that these materials be in the form of a powder having very small particle size. In carrying out the process at lower temperatures, e.g., below room temperature, it is frequently preferred to age the mixture of diluent and catalyst components, e.g., at 85 to 210° F. for 10 minutes to 24 hours or longer, before contacting these materials with the monomer.

The polymerization can be carried out in a conventional batch operation or continuous operation. When operating as a batch process, the diluent and catalyst components are added to the reactor prior to addition of the 1,3-butadiene. During the course of the polymerization, additional monomer and/or catalyst components and/or diluent can be added at intervals as desired. Upon completion of the particular polymerization run, the entire reaction mixture can be treated to inactivate the catalyst, purify the polymer, etc.

When operating in a continuous manner, the solvent or diluent, catalyst components, and 1,3-butadiene are added to a reaction zone at a relatively constant rate, and a corresponding amount of reaction mixture is removed from the zone at a relatively constant rate. This reaction zone may be a single vessel provided with a means for agitating the reaction mixture in order to provide as homogeneous a mixture as possible. Also, if desired, several such reaction vessels can be employed in series with the effluent from the first vessel passing to the second vessel, etc. Additional monomer, diluent, and catalyst components can be added, if desired, to any of the subsequent vessels. A tubular reactor in which the conversion gradient will vary from essentially zero at the inlet end to the maximum at the outlet end can be used. Additional catalyst, monomer, and diluent can be added, if desired, at points intermediate the inlet and outlet ends of this type of reactor.

The residence time in a continuous process will, of course, vary within rather wide limits depending upon such variables as temperature, pressure, the ratio of catalyst components, and catalyst concentration. In a continuous process, the residence time will generally fall within the range of one second to 24 hours when conditions within the specified ranges are employed. When a batch process is being employed, the time for the reaction can be as high as 24 hours or more.

Various materials are known to be destructive to these catalyst compositions. These materials include carbon dioxide, oxygen and water. It is highly desirable, therefore, that the 1,3-butadiene be free of these materials, as well as other materials which tend to inactivate the catalyst. Also, when a diluent is employed in the process, it is preferred that this material be substantially free of impurities such as water, oxygen, and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. Thus, it has been found that satisfactory polymerization rates can be obtained when as much as 500 to 1000 parts of water per 1,000,000 parts of reactor charge are present in the reactor. It is to be understood, however, that the amount of water which may be tolerated in the reaction mixture is insufficient to completely deactivate the catalyst.

At the completion of the polymerization reaction, when a batch process is used, the total reaction mixture is then treated to inactivate the catalyst and precipitate the rubbery polymer, as by adding an alcohol. The polymer is then separated from the alcohol and diluent by any suitable means, such as decantation or filtration. In order to purify the rubbery polymer, the separated polymer can be redissolved in a solvent and then again precipitated by the addition of an alcohol. The polymer is again separated, as indicated hereinbefore, and then dried. Any of the solvents listed hereinabove can be used in this purification step to redissolve the polymer. When the polymerization is carried out continuously, the total effluent from the reactor is pumped from the reactor to a catalyst-inactivating zone where the reactor effluent is contacted with a suitable catalyst-inactivating material, such as an alcohol. When an alcohol is used as the catalyst-inactivating material, it also acts to precipitate the polymer. In the event other catalyst-inactivating materials are employed which do not perform this dual function, it is also necessary to add a suitable material, such as an alcohol, to precipitate the polymer. The solvent and alcohol are then separated from the polymer by filtration or other suitable means and then dried. The rubbery polymer can also be redissolved in a solvent and again precipitated, as described above, in order to purify the material. The solvent and alcohol can be separated, for example, by fractional distillation, and reused in the process. It is also possible to utilize an antioxidant, such as phenyl-beta-naphthylamine or 2,2'-methylene bis(4-methyl-6-tertiarybutylphenol) to prevent oxidation of the rubbery polymer. The antioxidant can be added to the reaction mixture prior to precipitation of the polymer, to the solution of redissolved polymer, or to the solvent in which the polymer is to be subsequently redissolved.

The recipes employed for compounding the trans-polybutadiene used in the laminates of the present invention include the conventional recipes used for compounding synthetic rubber. We have found that while a sulfur curing system gives excellent bond strengths in forming laminates of trans-polybutadiene with polyethylene, the preferred laminates of the present invention are realized using a peroxide system, preferably, but not necessarily, using carbon black reinforcement.

The suitable peroxides are di($\alpha,\alpha$-dialkylaralkyl) peroxides of the formula:

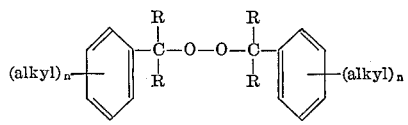

wherein R is lower alkyl, i.e., wherein each R is individually selected from the group consisting of alkyl groups containing 1 to 4 carbon atoms and wherein the total number of carbon atoms in said R groups does not exceed 10, where $n$ is 0 to 4 and alkyl is an alkyl group containing 1 to 4 carbon atoms, the total number of carbon atoms in said alkyl groups on each phenyl group not exceeding 4. Some examples of these peroxides which are applicable as vulcanizing agents for the polymers are bis($\alpha,\alpha$-dimethylbenzyl)peroxide (dicumyl peroxide); $\alpha$-methyl-$\alpha$-ethyl, $\alpha'$-ethyl-$\alpha'$-n-propyldibenzyl peroxide; $\alpha$-methyl-$\alpha$-isopropyl-$\alpha',\alpha'$-diisopropyldibenzyl peroxide; $\alpha,$-$\alpha$-di-n-butyl-$\alpha',\alpha'$-dimethyldibenzyl peroxide; $\alpha,\alpha$-dimethyl $\alpha',\alpha'$-diisopropyldibenzyl peroxide; $\alpha,\alpha$-diethyl-$\alpha',\alpha'$-di-n-propyldibenzyl peroxide; bis($\alpha$-ethyl-$\alpha$-methylbenzyl) peroxide; bis($\alpha,\alpha$-diethylbenzyl) peroxide; bis($\alpha$-isopropyl-$\alpha$-ethylbenzyl) peroxide; bis($\alpha$-tert-butyl-$\alpha$-methylbenzyl) peroxide; bis($\alpha,\alpha$-dimethyl-3-methylbenzyl) peroxide; bis-($\alpha,\alpha$-diethyl - 2 - ethylbenzyl) peroxide; bis($\alpha$-methyl-$\alpha$-ethyl-3-t-butylbenzyl) peroxide; bis($\alpha,\alpha$-dimethyl - 2,4-dimethylbenzyl) peroxide; $\alpha,\alpha$-diethyl-3,5 - diethylbenzyl-$\alpha'$-ethyl-$\alpha'$-n-butyl-3-methyl-4-n-propylbenzyl peroxide; and bis($\alpha,\alpha$-dimethyl-4-isopropylbenzyl) peroxide.

The amount of peroxide of the above general formula or of a mixture of two or more peroxides of the general formula which can be used to vulcanize trans-polybutadiene by the method of this invention generally varies in the range between 0.25 and 5 parts by weight per 100 parts by weight of the transbutadiene which is to be vulcanized.

In forming of the laminates of the invention, the laminae are laid up with the compounded trans-polybutadiene layer or layers each adjacent to a polyolefin layer. The composite is then placed under pressure and heated to a temperature in the range between about 275 and 500° F. for from 3 minutes to 2 hours to cure the laminate and form the bond between the lamina, the particular conditions used being selected in accordance with the curing system used.

Polyolefins used in making the laminates of the invention include solid polymers of aliphatic 1-monoolefins of 2 to 8 carbon atoms containing no branching nearer the double bond than the 4-position, including ethylene, propylene, 1-butene, 1-pentene, 4-methyl-1-pentene, 1-hexene, 1-heptene, and 1-octene. Copolymers of these olefins are also suitable such as 90/10 ethylene/1-butene copolymer. The polyethylene used in the examples was prepared according to the method of Hogen et al. 2,825,721 (1958) and these are the preferred polymers. However, other methods of polymerization produce suitable polymers. These include high and low pressure, non-catalytic and catalytic polymerization processes. The molecular weight should be 5000 to several million as determined by the formula $$M = 24,500 \ N_i$$

where M is the weight average molecular weight and $N_i$ is the inherent viscosity as determined for a solution of 0.2 gram of the polymer in 50 ml. of tetralin at 266° F. This type of molecular weight determination is described by Kemp and Peters, Inc. Eng. Chem. 35, 1108 (1943) and by Dienes and Klemm, J. Applied Phys. 17, 458 (June 1946). The density of the solid polymers can range from 0.900 to 1.000 as determined at 73.4±2° F. by immersion in a solvent having a density equal to that of the polymer, a Westphal balance being utilized. For density determination samples are molded at 20,000 p.s.i. and 330° F., thereafter cooled to 200° F. at 25° F./min., and then to 150° F. as rapidly as possible. The material is tested after maintaining at room temperature for 24 hours.

TESTING PROCEDURES

Testing of bond strength of the laminates of the invention was done by measuring peel strength and butt splice strength. For these tests the transpolybutadiene was compounded on a hot roll mill using the particular recipe chosen. The temperature of this milling step was in the range between about 180 and 280° F. The compounded stock was sheeted out to a thickness of about 0.040 inch for peel tests and to about 0.080 inch for butt splice tests.

Test specimens were made for the peel tests by superimposing a 6″ x 6″ piece of 0.040 thickness trans-polybutadiene sheet on a piece of polyethylene sheet of approximately the same dimensions, in a 6″ x 6″ mold, a piece of aluminum foil about one inch wide being interposed between the laminae at one edge to provide an unbonded area. The assembly was then placed under about 250 p.s.i. pressure at the curing temperature. When removed from the mold, the laminate was cut into 0.5 inch wide strips with the unbonded area at the end. Peel strength was determined by gripping the free ends of the laminae in the clamps of a Scott testing machine and pulling at a finite rate to peel the strips apart. The maximum pull observed during the peeling operation was recorded as peel strength.

For the butt-splice tests, a ½ inch by 0.080 inch strip of polyethylene was placed between 2 pieces of 2¾″ x 6″ x 0.080″ compounded trans-polybutadiene in a 6″ x 6″ mold in edge to edge position. Curing was effected as described above. The spliced sheet was removed from the mold and cut into tensile specimens, died out in a manner such that the lines of splice were transverse of the specimen about midway between the ends. These were pulled in the Scott tensile machine until they broke, the pull at break and the location of the break being recorded, the pull at break being butt splice strength. Tests for butt-bonding with other rubbers were made in the same manner.

The following examples illustrate our invention but should not be considered unduly limiting.

Example I

Samples of trans-polybutadiene (87 percent trans) prepared using a lithium aluminum hydride/titanium tetraiodide initiator system and of emulsion butadiene-styrene rubber (Philprene 1500) were compounded separately on a roll mill. Butt splice tests were made from each of the above with a high density (0.960) polyethylene (0.9 melt index). Data on these tests are shown in Table I.

TABLE I

| Sample No. | Compounding recipe (parts) | |
|---|---|---|
|  | A | B |
| Trans-polybutadiene | 100 |  |
| Butadiene-styrene copolymer |  | 100 |
| Carbon black (Philblack O) | 50 | 50 |
| Zinc oxide | 3 | 3 |
| Stearic acid | 1 | 1 |
| Flexamine[1] | 1 | 1 |
| Sulfur | 1.75 | 1.75 |
| NOBS special[2] | 1.25 | 1.25 |
| Curing temperature, °F | 307 | 307 |
| Curing time, min | 30 | 30 |

[1] A physical mixture consisting of 65 percent of a diarylamine-ketone reaction product and 35 per cent of N,N'-diphenyl-p-phenylenediamine.
[2] N-oxydiethylene benzothiazone-2-sulfenamide.

Butt-splice strength, pulled at 20 in./min.
To polyethylene, average of 4 tests: p.s.i.
A ------------------------------------- 1025
B ------------------------------------- 315

These tests show that trans-polybutadiene bonded to high density polyethylene in butt-splices provides a bond strength 225 percent higher than that observed when butadiene-styrene copolymer is bonded to polyethylene.

Example II

A series of tests was run to determine effect of trans-content and sulfur on butt-splices with high density (0.960) polyethylene (0.9 melt index). Data on these tests are shown in Table II.

TABLE II.—Compounding Recipe

| Sample No. | Parts | | | |
|---|---|---|---|---|
|  | A | B | C | D |
| Trans-polybutadiene | 100 | 100 | 100 |  |
| Trans-content, percent | 87 | 84 | 84 |  |
| Butadiene-styrene copolymer |  |  |  | 100 |
| Philblack O | 50 | 50 | 50 | 50 |
| Zinc oxide | 3 | 3 | 3 | 3 |
| Stearic acid | 2 | 2 | 2 | 2 |
| Flexamine | 1 | 1 | 1 | 1 |
| Sulfur | 1.75 | 1 | 5 | 1.75 |
| NOBS special | 1.25 | 1.25 | 1.25 |  |
| Santocure* |  |  |  | 1.2 |
| Extender oil (Philrich 5) |  |  |  | 10 |
| Curing temperature, °F | 307 | 307 | 307 | 307 |

* N-cyclohexyl-2-benzothiazole-sulfenamide.

| Sample No. | Butt splice strength, pulled at 20 in./min. (p.s.i) | | | | |
|---|---|---|---|---|---|
|  | A | B | B' | C | D |
| Cure time, min | 30 | 30 | 70 | 30 | 30 |
| Average value | 935 | 600 | 610 | 435 | 325 |
| Number of tests | 3 | 3 | 5 | 3 | 3 |

These tests show that increasing the sulfur level from 1 to 5 parts per 100 parts by weight of rubber decreases bond strength. Test B' shows that extending curing time has little effect on bond strength.

Example III

A series of tests was made to determine the effect of using a dicumyl peroxide (Di-Cup) system instead of a sulfur system for compounding the transpolybutadiene prepared using the initiator of Example I. Butt splice and peel strength tests were made with high density polyethylene. Data on these tests are presented in Table III.

TABLE III.—COMPOUNDING RECIPE

| | Parts | | | |
|---|---|---|---|---|
| | A | B | C | D |
| Trans-polybutadiene (84% trans) | 100 | 100 | 100 |  |
| Butadiene-styrene copolymer |  |  |  | 100 |
| Philblack O | 50 | 50 | 50 | 50 |
| Circosol 2 X H[1] | 5 | 5 | 5 | 5 |
| Dicumyl peroxide[2] | 0.9 | 2.0 | 4.0 | 0.9 |
| Cure temperature, °F | 307 | 307 | 307 | 307 |
| Cure time, min | 30 | 30 | 30 | 30 |
| Tensile, p.s.i | 2,400 | 2,740 | 1,780 | 2,700 |

[1] Petroleum hydrocarbon softener containing hydrocarbons of high molecular weight in the form of a heavy viscous, transparent, pale green, odorless liquid of low volatility: sp. gr. 0.940; Saybolt Universal viscosity at 100° F., about 2,000 seconds.
[2] Used on inert support (40% dicumyl peroxide on calcium carbonate).

Butt splice, pulled at 20 in./min., p.s.i.

| | | | | |
|---|---|---|---|---|
| Test 1 | 1,050 | [1]1,570 | [2]1,350 | 300 |
| Test 2 | 1,350 | [2]2,000 | [2]1,550 | 200 |

[1] Defect in polyethylene (bubble). Sample broke.
[2] Rubber broke leaving bond intact.

| | Peel strength, pulled at 2 in./min., pounds per inch | | | |
|---|---|---|---|---|
| Test 1 | 41.2 | ([1]) | ([1]) | 24 |
| Test 2 | 45.2 |  |  | 28 |

[1] Rubber broke, bond intact.

These tests show that when using a dicumyl peroxide system, bond strength was far in excess of the control and frequently higher than the tensile strength of the rubber in butt splices. Peel strength of the trans-polybutadiene laminates to polyethylene was better than the respective butadiene-styrene copolymer-polyethylene laminae.

Example IV

Additional tests were made using a compounding recipe in which sulfur and dicumyl peroxide were combined. As controls, natural rubber and an emulsion butadiene-styrene copolymer (Philprene 1520) were used. The trans-polybutadiene was prepared using a lithium aluminum hydride/titanium tetraiodide system.

Data on these tests are tabulated in Table IV.

TABLE IV.—TRANS-POLYBUTADIENE AS BONDING AGENT

| Test No. | O | P | R | S |
|---|---|---|---|---|
| Trans-polybutadiene(a) | 100 |  |  |  |
| Trans-polybutadiene(b) |  | 100 |  |  |
| Philprene 1500 |  |  | 100 |  |
| #1 smoked sheet |  |  |  | 100 |
| Philblack O | 25 | 25 | 25 | 25 |
| Zinc oxide | 25 | 25 | 25 | 25 |
| Stearic acid | 0.5 | 0.5 | 0.5 | 0.5 |
| Agerite resin D[1] | 1.0 | 1.0 | 1.0 | 1.0 |
| Sulfur | 3.0 | 3.0 | 3.0 | 3.0 |
| Dicumyl peroxide[2] | 2.0 | 2.0 | 2.0 | 2.0 |

[1] Polymerized dimethyl dihydroquinone.
[2] Used on inert support (40% dicumyl peroxide on calcium carbonate).

| | Physical properties (30 min cure at 345° F.) | | | |
|---|---|---|---|---|
| $\nu \times 10^4$, moles/cc | 2.65 | 2.03 | 2.42 | 1.24 |
| Compression set, percent | 3.3 | 1.8 | 2.8 | 5.8 |
| 300% modulus, p.s.i | 1,450 | 1,260 | 1,160 | 640 |
| Tensile | 1,800 | 2,625 | 2,225 | 2,525 |
| Elongation, percent | 320 | 460 | 420 | 600 |
| Tear, lb./in | 110 | 180 | 135 | 120 |
| Shore hardness | 77 | 84 | 58 | 47 |
| Butt splice to polyethelene, p.s.i | 1,250 | 705 | 350 | 50.5 | a 131 ML-4 at 212° F.; 88% trans.
b 19 ML-4 at 212° F.; 94% trans.

This example shows that bonds of polyethylene to trans-polybutadiene were significantly stronger than bonds of polyethylene to natural rubber or of polyethylene to butadiene-styrene copolymer, when using this recipe.

To determine the amount of trans-1,4-addition, the polymer is dissolved in carbon disulfide to form a solution having 20 grams of polymer per liter of solution. The infrared spectrum of such a solution (percent transmission) is then determined in a commercial infrared spectrometer.

The percent of the total unsaturation present as trans-1,4- is calculated according to the following equation and consistent units:

$$\epsilon = \frac{E}{tc}$$

where: $\epsilon$=extinction coefficient (liters-mols$^{-1}$-microns$^{-1}$); $E$=extinction (log Io/I); $t$=path length (microns); and $c$=concentration (mols double bond/liter). The extinction is determined at the 10.35 micron band and the exinction coefficient used is $1.21 \times 10^{-2}$(liters-mols$^{-1}$-microns$^{-1}$).

The percent of the total unsaturation present as 1,2- (or vinyl) is calculated according to the above equation, using the 11.0 micron band and an extinction coefficient of $1.52 \times 10^{-2}$(liters-mols$^{-1}$-microns$^{-1}$).

The percent of the total unsaturation present as cis-1,4- is obtained by subtracting the trans-1,4- and 1,2-(vinyl) determined according to the above methods from the theoretical unsaturation assuming one double bond per each $C_4$ unit in the polymer.

As many possible embodiments can be made of this invention without departing from the scope thereof, it is to be understood that all matter herein set forth is to be interpreted as illustrative and not as unduly limiting the invention.

We claim:
1. A laminated structure comprising a lamina of a normally solid polymer of at least one aliphatic mono-1-olefin having from 2 to 8 carbon atoms per molecule and containing no branching nearer the double bond than the 4-position and a lamina of a cured polybutadiene, said polybutadiene being characterized by having from 70 to 100 percent of the $C_4$ units in the 1,4-transconfiguration and by having been produced by contacting 1,3-butadiene under polymerization conditions in a hydrocarbon solvent with a catalyst comprising (a) a complex aluminum hydride corresponding to the formula $MAlH_4$, wherein M is selected from the group consisting of lithium, sodium, potassium, rubidium, and cesium, and (b) titanium tetraiodide wherein said polybutadiene is cured with a curing agent selected from the group consisting of sulfur and a peroxide of the formula

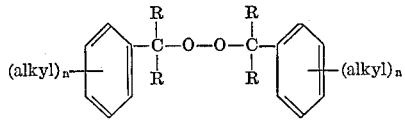

wherein each R is individually selected from the group consisting of alkyl groups containing 1 to 4 carbon atoms and wherein the total number of carbon atoms in said R groups does not exceed 10, where $n$ is 0 to 4 and alkyl is an alkyl group containing 1 to 4 carbon atoms, the total number of carbon atoms in said alkyl groups on each phenyl groups not exceeding 4, by heating the polybutadiene lamina containing said curing agent upon contact with said olefin polymer lamina at a temperature within the range of 275° to 500° F. for from 3 minutes to 2 hours.

2. A laminated structure according to claim 1 wherein said olefin polymer is polyethylene.

3. An article according to claim 1 wherein said curing agent is sulfur.

4. An article according to claim 1 wherein said polybutadiene is cured with bis($\alpha,\alpha$-dimethylbenzyl) peroxide.

5. An article according to claim 1 wherein said polybutadiene is cured with a mixture of sulfur and bis($\alpha,\alpha$-dimethylbenzyl) peroxide.

6. An article according to claim 1 wherein said catalyst consists essentially of lithium aluminum hydride and titanium tetraiodide.

7. An article according to claim 1 wherein said structure comprises polyethylene sheets bonded edge to edge by an intervening strip of trans-polybutadiene.

References Cited

UNITED STATES PATENTS

| | | | |
|---|---|---|---|
| 3,024,813 | 3/1962 | Sear et al. | 161—253 |
| 3,050,513 | 8/1962 | Zelinski et al. | 260—94.3 |
| 3,111,451 | 11/1963 | Peters | 161—216 |

OTHER REFERENCES

Fisher: "Chemistry of Natural and Synthetic Rubbers," Reinhold Publishing Co., pp. 19 and 29 cited, 1957.

ROBERT F. BURNETT, Primary Examiner

R. J. ROCHE, Assistant Examiner

U.S. Cl. X.R.

156—110; 161—253; 260—94.3, 94.7